Figure 1:
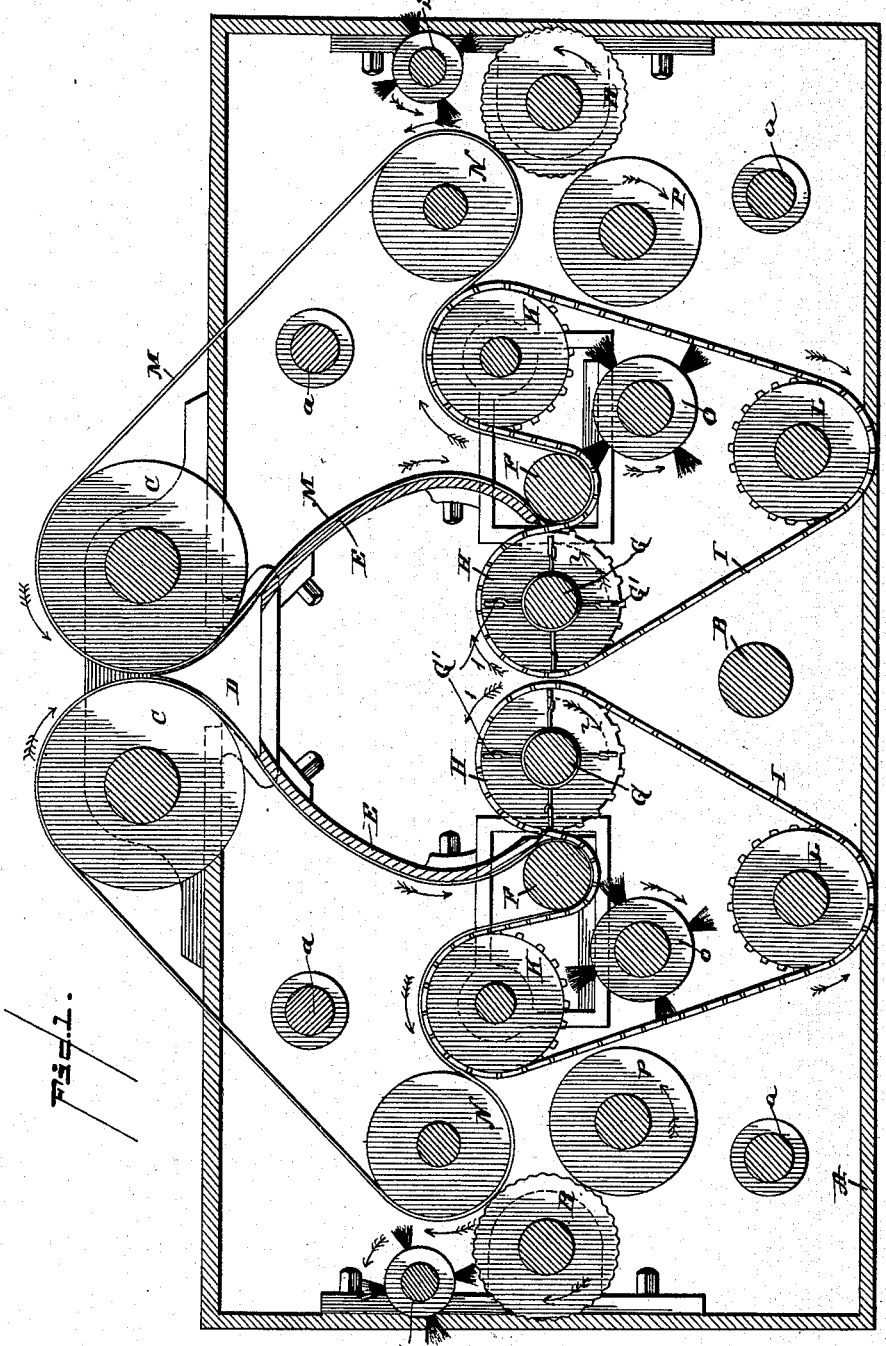

(No Model.) 3 Sheets—Sheet 1.

J. J. GREEN.
MACHINE FOR DISINTEGRATING HEMP, JUTE, RAMIE, &c.

No. 388,663. Patented Aug. 28, 1888.

WITNESSES,

INVENTOR,
Joshua J. Green.
by
Marcellus Bailey
his Attorney.

(No Model.) 3 Sheets—Sheet 2.
J. J. GREEN.
MACHINE FOR DISINTEGRATING HEMP, JUTE, RAMIE, &c.
No. 388,663. Patented Aug. 28, 1888.
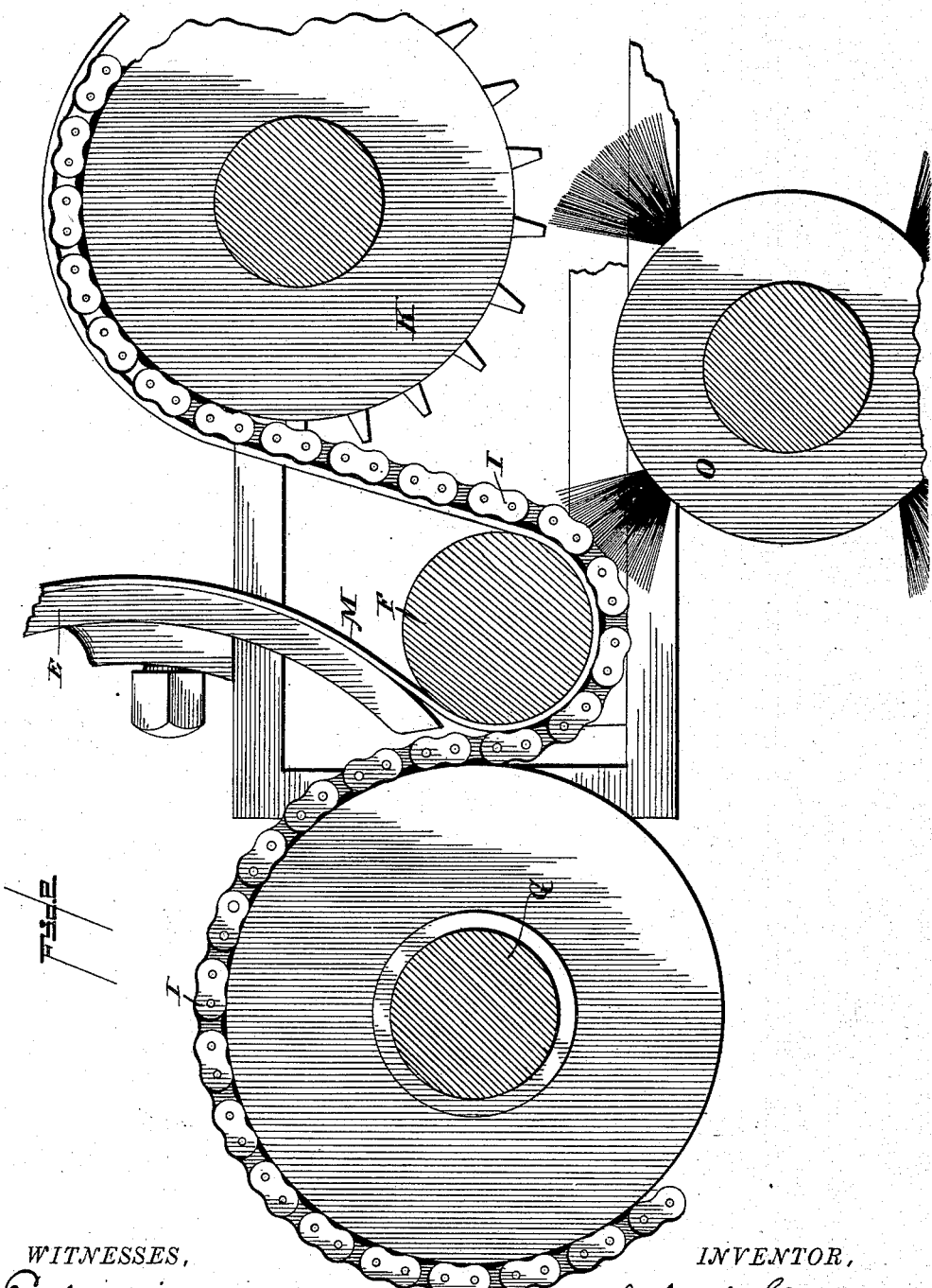
WITNESSES,
INVENTOR,
Joshua J. Green.
by Marcellus Bailey,
his Attorney.

(No Model.) 3 Sheets—Sheet 3.
J. J. GREEN.
MACHINE FOR DISINTEGRATING HEMP, JUTE, RAMIE, &c.
No. 388,663. Patented Aug. 28, 1888.
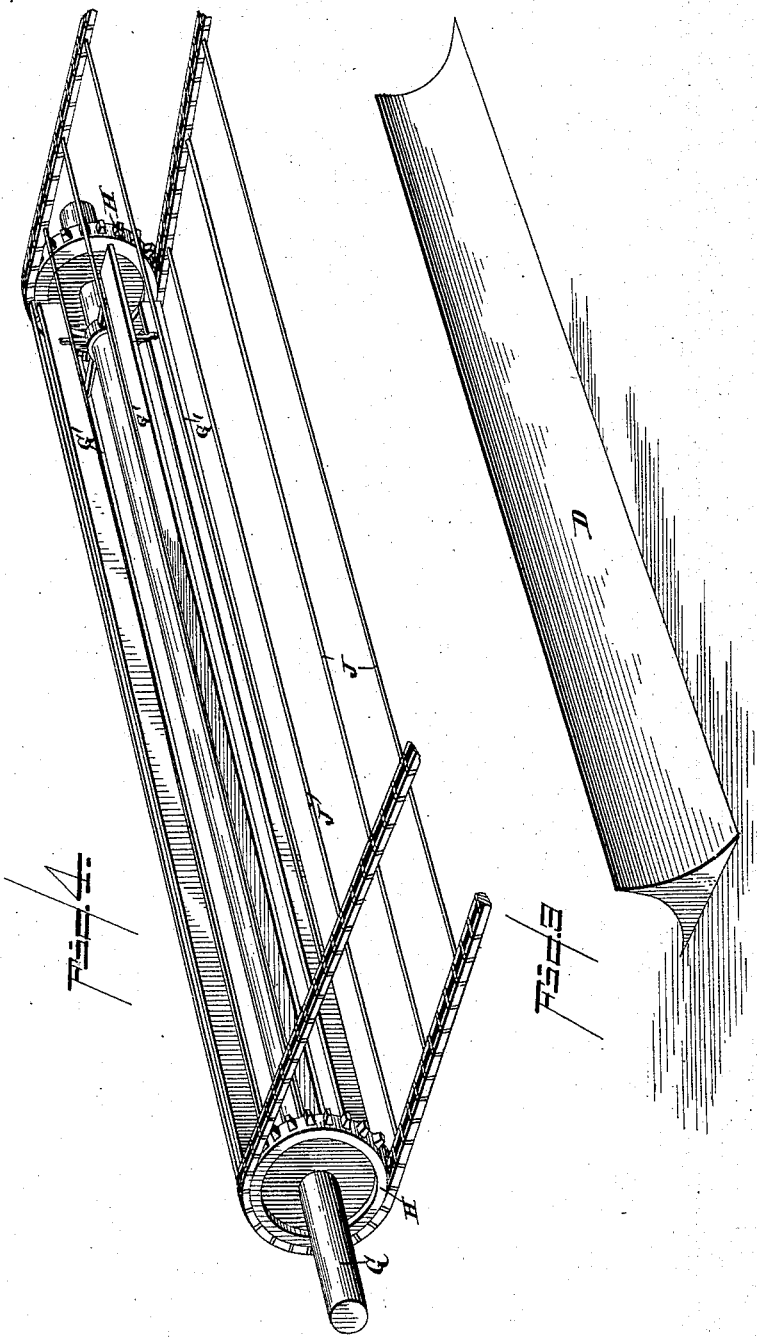
WITNESSES.
INVENTOR.
Joshua J. Green.
his Attorney.

UNITED STATES PATENT OFFICE.

JOSHUA J. GREEN, OF NEW YORK, N. Y.

MACHINE FOR DISINTEGRATING HEMP, JUTE, RAMIE, &c.

SPECIFICATION forming part of Letters Patent No. 388,663, dated August 28, 1888.

Application filed February 6, 1888. Serial No. 263,155. (No model.)

*To all whom it may concern:*

Be it known that I, JOSHUA J. GREEN, of New York city, in the county and State of New York, have invented certain new and useful Improvements in Machines for Disintegrating Hemp, Jute, Ramie, and the Like, of which the following is a specification.

My invention has reference mainly to separating and removing the pith of hemp, ramie, and other fibrous stalks from its fibrous integument. As a preliminary step to this operation it has been customary to split the stalk in two longitudinally, so as to expose its pithy interior, and this step I avail of also. Afterward the split stalk has on its pithy side been acted on by a beater with a view to remove the pith, and this operation is performed also in my machine; but to carry out the operation I have devised a novel combination of instrumentalities by which the pith is presented with certainty to the beater, and the latter is enabled to strip and remove it effectively from the fibrous portion of the stalk. It is in this combination that my invention mainly is comprised. I combine a feed-apron with a skeleton or open-work apron, between which two aprons (both of them being power-driven) the material is confined, these two aprons making a sharp bend around a bar or roll of small diameter. The purpose of this sharp bend is to break the pith of the stalk, which is brittle, and the broken rear portion of the pith will then project through the interstices of the skeleton apron in a position to be acted on by the beater, which revolves in close proximity thereto. The skeleton apron, for reasons hereinafter stated, should, for effective work, move much more rapidly than the feed-apron, and the beater should revolve in a direction opposite to the feed. I also combine with the feed-apron a guide-plate, between which and the feed-apron the split stalk is conducted from the feed-rolls to the point where it meets the skeleton apron and is acted on by the beater: These and other features of my invention can best be explained and understood by reference to the accompanying drawings, in which—

Figure 1 is a longitudinal vertical central section of a machine embodying my invention in its preferred form. Fig. 2 is an enlarged view of a portion of one of the beaters, together with the parts of the feed-apron, skeleton apron, and guide-plate adjacent thereto. Fig. 3 is a view of the splitting-knife. Fig. 4 is a front elevation of the beater and its attached shaft, with the end sprocket-wheels for the skeleton aprons loose on said shaft.

The various parts of the machine are supported in a frame, A, of suitable construction, the sides of which are held together by cross-bars or tie-rods $a$. The power-driven parts of the mechanism derive their movement from the driving-shaft B through the intermediary of suitable gearing, which I have not deemed it necessary to represent. The direction of movement of the several instrumentalities is indicated by the arrows in Fig. 1.

C C are the feed-rolls power-driven from driving-shaft B, and D is the triangular splitting-knife between said rolls, by which each stalk as it is fed along is split in two, the two halves passing down on opposite sides of the knife to the guide-plates E, which are on the prolongation of the base of the knife. The machine, in fact, is a double machine, one half operating upon one half of the split stalk and the other on the other half of said stalk. A description of one-half of the machine, therefore, will answer for both.

At the lower end of the guide-plate E are two rolls or shafts, the one, F, being what I shall term the "breaker" roll or bar, (in practice of about two inches in diameter only,) and the other the "beater-shaft" G, on which are fixed the radial beater-arms G', and on which are also loosely mounted idler sprocket-wheels H for the sprocket-chains of the skeleton apron. This endless skeleton apron consists of sprocket-chains I, connected by cross wires or bars J, (in practice usually of three-sixteenths of an inch in diameter,) set at intervals apart, say seven inches, (more or less.) This skeleton apron passes from the sprocket-wheels H, down under the breaker-bar F, up over an idle drum or roll, K, having sprocket-wheels fixed to its ends; thence down under a like sprocket roll or drum L, which is geared to and driven from driving-shaft B, and thence up and back again to the sprocket-wheels H. The endless feed-apron, which cooperates with this skeleton apron, is indicated at M. It passes over the feed-roll C, down along the guide-plate E; thence under the breaker-bar F, between the latter and the skeleton apron; thence up over the sprocket-roll K and the skeleton apron thereon; thence under the idle-roll N, and thence up and back to the feed-roll. The skeleton apron passes as near as possible to the lower end of the guide-plate E, and the beater-arms are set so as to revolve in as close proximity as possible to the skeleton apron. The lower end of the guide-plate forms, in fact, a ledge or corner, over which the pith of the stalk is broken by the beater, and in practice the outer edge of the beater-arms are but about half an inch or so from this ledge.

In Fig. 1, arrows 1 indicate the direction of rotation of the sprocket-wheels H appertaining to the skeleton apron, and arrows 2 indicate the direction of rotation of the beater. It will be noted that the beater revolves in a direction opposite to that in which the feed takes place, and this is essential in order to obtain the best results. The skeleton apron is geared to move considerably faster than the feed-apron. In practice the skeleton apron travels at about twice the speed of the other.

A revolving brush, O, may be provided to act on the fibers as they pass the breaker-roll in order to clean them of any fragments of pith which possibly may still adhere; but this appliance is not indispensable. The machine may be of any width desired. I have found in practice that good results can be obtained with aprons of about fifty inches in width. The feeding of the stalks to such a machine can be attended to conveniently by one person. I have not deemed it necessary, however, to represent the mechanical instrumentalities which may be used to convey and present the stalks to the feed-rolls C, for these form no part of my invention.

I have described the construction of skeleton apron which I prefer; but obviously the construction can be varied considerably without departure from my invention.

Such being the organization of the parts, the mode of operation is as follows: The stalks are presented butt-end foremost to the feed-rolls C. A stalk when caught by these feed-rolls is carried down between them, and by the knife D is split in two longitudinally, one part passing down to one side of the knife and the other to the other. As each half of the split stalk undergoes the same treatment, a description of the course of one will answer for both. The split half, with its inner side or pith next to the guide-plate, is carried down butt foremost between that plate and the traveling apron M. As it passes beyond the lower end of the guide-plate it naturally tends to diverge from the apron M, which is beginning to change its course so as to pass around under the breaker bar or roll F; but this tendency is neutralized by the more rapidly-moving skeleton apron, the cross bars or wires J of which strike the butt-end of the stalk with sufficient rapidity to deflect and bend it under the bar F until it is caught and held between the two aprons. The stalk is thus bent abruptly around the bar F, with the effect of causing its brittle interior or pith to snap and break at a point some little distance back of the butt—indeed, just about at the point where the guide-plate ends, or a little below that point. The pith to the rear of the break as the stalk is drawn along separates from the fibrous integument and projects out toward and through the interstices between the cross-wires J of the skeleton apron, and is struck and broken off by the rapidly-revolving beater over the lower end of the guide-plate, or, indeed, over the wires J at times, as a shoulder or ledge. The cross-wires J, it is true, strike this continually-projecting end of the pith; but in the intervals between the strokes the end of the pith (after the wires pass it) springs back and projects, as before, through between the wires and into the path of the beater. In this way I am enabled, feeding the stalks butt-end foremost, to provide a beater which shall revolve in a direction opposite to the direction of feed, which arrangement is most desirable, because the beater acts upon the pith in the direction of the growth of the fibers in the stalk—a direction in which the pith can be stripped and removed from the fibers most effectively and easily.

It will be noted that by this operation the portion of the pith in front of the break has passed beyond and is not acted on by the beater; but this small portion is effectively removed by the cross-wires of the skeleton apron. The stalk moves with the more slowly-moving feed-apron M, and consequently the cross-wires of the more rapidly-moving skeleton apron enter between the pith and the fibrous exterior and act as knives or strippers to separate the two. The fibers in this way are rid of the pith, and after passing along between the two aprons are discharged at the point where the two aprons diverge just beyond the sprocket-roll K.

In some instances—as, for example, in the case of ramie, which has an outer integument or scale which must also be removed from the fibrous portion of the stalk—the material after leaving the aprons is passed between two power-driven rolls, P R, the one, P, a gum or rubber roll, the other, R, a corrugated-metal roll. Said rolls are differentially speeded, the rubber roll P moving at about the same surface-speed as the rolls hereinbefore described, while the corrugated roll R runs somewhat faster than the other, so as to exercise a scraping action. By these rolls the outer integument is scraped off and removed. A rotary cleaning-brush, S, is used in connection with the corrugated roll. Such an arrangement of rolls, however, is usual in machines of this class and is not of my invention.

Having described my improvements and the best way now known to me of carrying the same into effect, I desire it to be understood that I do not restrict myself to the particular details of construction hereinbefore specified, for manifestly the same can be varied considerably without departure from my invention; but

What I claim herein as new, and of my invention, is as follows.

1. The combination of the feed-apron, the skeleton apron, the breaker bar or roll, and the beater, substantially as and for the purposes hereinbefore set forth.

2. The combination of the guide-plate, the feed-apron, the breaker-bar, the beater, and the skeleton apron, substantially as and for the purposes hereinbefore set forth.

3. The combination of the feed-rolls, the splitting-knife, the guide-plate, the feed-apron, the skeleton apron, the breaker-bar, and the beater, substantially as and for the purposes hereinbefore set forth.

In testimony whereof I have hereunto set my hand this 2d day of February, 1888.

J. J. GREEN.

Witnesses:
EWELL A. DICK,
MARVIN A. CUSTIS.